United States Patent [19]
Ma et al.

[11] Patent Number: 5,965,671
[45] Date of Patent: Oct. 12, 1999

[54] MODIFIED PHENOLIC RESIN TOUGHENED BY POLY (ALKYLENE OXIDE) AND PREPARATION THEREOF

[75] Inventors: Chen-Chi Martin Ma, Hsinchu; Hew-Der Wu, Taipei; Chih-Tsung Lee, Hsinchu, all of Taiwan

[73] Assignee: National Science Council, Taipei, Taiwan

[21] Appl. No.: 09/035,486

[22] Filed: Mar. 5, 1998

[51] Int. Cl.$^6$ .................................................... G08G 65/32
[52] U.S. Cl. ............................................. 525/405; 525/507
[58] Field of Search ...................................... 525/405, 507

[56] References Cited

U.S. PATENT DOCUMENTS

| | | | |
|---|---|---|---|
| 3,342,606 | 9/1967 | Silver | 96/114 |
| 4,079,031 | 3/1978 | Sardessai et al. | 525/507 |
| 4,814,094 | 3/1989 | Blair, Jr. et al. | 525/507 |
| 4,814,394 | 3/1989 | Barthold et al. | 525/507 |
| 5,272,226 | 12/1993 | Lancaster et al. | 525/507 |
| 5,534,302 | 7/1996 | Ma et al. | 525/456 |
| 5,559,197 | 9/1996 | Ma et al. | 525/533 |

OTHER PUBLICATIONS

Chen–Chi Martin Ma, Chih–tsung Lee and Hew–Der Wu. "Pultruded Glass Fiber Reinforced Poly(ethylene oxide) Toughened Novolac Type Phenolic Resin Composites: Mechanical Properties, Morphology and Flame Retardance." Proceeding of the 20th ROC Polymer Symposium, June 1997, pp. 96–96.

*Primary Examiner*—Randy Gulakowski
*Attorney, Agent, or Firm*—Hitt Chwang & Gaines, PC

[57] ABSTRACT

Modified resole and novolac type phenolic resins which are toughened by poly(alkylene oxide) are disclosed. The modified resole type phenolic resin is prepared by the following steps: mixing a poly(alkylene oxide) having a weight average molecular weight of 100,000~8,000,000 and phenol in a weight ratio of poly(alkylene oxide): phenol=1.5:1~1:1 at an elevated temperature to form a glutinous mixture; mixing the glutinous mixture with an acid catalyst to obtain a viscous mixture having a relatively low viscosity compared to the glutinous mixture; and mixing the viscose mixture with a resole type phenolic resin. The modified novolac type phenolic resin is prepared by directly mixing the glutinous mixture with a liquid novolac type phenolic resin. The amount of the poly(alkylene oxide) mixed is 2~10 wt % based on the phenolic resin.

44 Claims, No Drawings

MODIFIED PHENOLIC RESIN TOUGHENED BY POLY (ALKYLENE OXIDE) AND PREPARATION THEREOF

FIELD OF THE INVENTION

The present invention is related to a modified phenolic resin, in particular to a modified phenolic resin which is toughened by poly(alkylene oxide).

BACKGROUND OF THE INVENTION

Conventional resins used in a pultrusion process for making a fiber reinforced resin composite are thermoset resins, such as unsaturated polyester resin and epoxy resins. Phenolic resin which is known to have excellent mechanical properties and electrical properties, especially at elevated temperatures, has been used to produce fiber reinforced products by prepreging, compounding, reaction injection molding or pultrusion processes, but phenolic resin used as a binder in the fabrication of a fiber reinforced composite product so far is still not so popular compared to the others due to its brittle nature which causes its poor coupling with fiber, its slow curing rate, and due to the side product (water) which may be generated causing void defects. Therefore there is a need in the composite industry to improve the quality and properties of a pultruded fiber reinforced phenolic based resin composite.

Several methods have been developed to toughen phenolic resin. For examples, U.S. Pat. No. 2,267,390 uses China wood oil (tung oil), Japanese Patent No. 29-7595 uses rosin, U.S. Pat. No. 2,675,335 uses alkyl phenol, U.S. Pat. No. 4,125,502 uses vinyl acetate and U.S. Pat. No. 4,157,324 uses high ortho etherified resole type phenolic resin for toughening phenolic resin. However, these methods all require the modifying agents to react with phenolic resin for a period of time in order to obtain the desired toughening effect.

At present meta-hydroxyl phenol catalyst is used to shorten the gel time of phenolic resin so that it can be used in manufacturing a fiber reinforced composite product; however, the addition of meta-hydroxyl phenol catalyst also decreases the storage stability of phenolic resin and pot life of phenolic resin.

It is known that the coupling between phenolic resin and the surface of a common fiber is poor, and filaments having a special surface treatment are necessary for the fabrication of a fiber reinforced phenolic resin, e.g. filaments having a special surface treatment by isocyanate based coupling agent are available from the fiber glass manufacturers, e.g. Clark-Schwebel Fiberglass Corp., US, etc. These special treated filaments result in more stocks and production costs, and an additional operation procedure of changing different filaments.

U.S. Pat. No. 5,559,197 discloses a modified phenolic resin which is toughened by phenoxy resin, in which the modified phenolic resin is prepared by the following steps: mixing a phenoxy resin having a weight average molecular weight of 10,000~1,000,000 and phenol in a weight ratio of phenoxy resin: phenol=1.5:1~1:1 at an elevated temperature to form a glutinous mixture; mixing the glutinous mixture and an acid catalyst to obtain a viscous mixture having a relatively low viscosity compared to the glutinous mixture; mixing the viscose mixture and a resole type phenolic resin to form a modified phenolic resin, wherein the resole type phenolic resin has a solid content of 60~75 wt % and a free aldehyde content of 5~10 wt %, the amount of the acid catalyst mixed is 2~10 wt %, and the amount of the phenoxy resin mixed is 3~25 wt % based on the resole type phenolic resin.

Poly(alkylene oxide) such as poly(ethylene oxide) (PEO) is a high crystalline and water soluble polymer. A suitable method for preparing this polymer includes polymerizing alkylene oxide via a coordination polymerization mechanism catalyzed by an oxide of salt of alkaline earth metal (Ca, Ba and Sr) or a co-catalyst formed by a metallic organo-compound and water. A high molecular weight PEO ($10^5$–$10^7$) is able to be extruded to form a high crystalline solid article. Typical applications of PEO are used as a water soluble packing film, a surfactant, a sizing agent, a gelatining agent, a thickening agent, and a biomedical material, and in preparing an electrically conductive polymer blend.

To our knowledge there is no one in the prior art who taught or suggested using poly(alkylene oxide) to toughen phenolic resin, and enhance the coupling between phenolic resin and fiber at the same time.

SUMMARY OF THE INVENTION

The primary objective of the present invention is to provide both a modified resole type phenolic resin and a modified novolac type phenolic resin toughened by poly (alkylene oxide).

In order to achieve the objective a modified resole type phenolic resin accomplished in accordance with the present invention comprises:

a) a poly(alkylene oxide) having a weight average molecular weight of 100,000~8,000,000;

b) a phenol;

c) an acid catalyst; and d) a rescle type phenolic resin having a solid content of 60~75 wt % and a free aldehyde content of 5~10 wt %;

in which the amounts of components a), b) and c) are 2–10%, 2–15% and 2–10%, respectively, based on the weight of component d).

Preferably, the amount of component a) is about equal to that of component of b) by weight, and more preferably, is 4–8 wt % based on the weight of component d) in the modified resole type phenolic resin toughened by poly (alkylene oxide).

The present invention also discloses a modified novolac type phenolic resin toughened by poly(alkylene oxide) comprising:

a) a poly(alkylene oxide) having a weight average molecular weight of 100,000~8,000,000;

b) a phenol; and d') a novolac type phenolic resin having a viscosity of 200–2000 cps at 25° C., preferably 300 cps at 25° C.;

in which the amounts of components a) and b) are 2–10% and 2–15%, respectively, based on the weight of component d').

The modified novolac type phenolic resin may further comprise 2–15 wt %, preferably 10 wt %, of a curing agent based on the weight of component d').

The curing agent may be any curing agents for use in cross-linking the novolac type phenolic resin known in the art, for examples, polyamines such as hexamethylene tetramine and S-triamine, acetals and non-aldehyde phosphine compounds such as trimethylol phosphine oxide. Preferably, the curing agent is hexamethylene tetramine.

Preferably, the amount of component a) is about equal to that of component of b) by weight, and more preferably, is 4–8 wt % based on the weight of component d') in the modified novolac type phenolic resin toughened by poly (alkylene oxide).

The poly(alkylene oxide) suitable for use in the present invention includes (but not limited to) poly(ethylene oxide), poly(propylene oxide) and a mixture of poly(ethylene oxide) and poly(propylene oxide). Preferably, the poly(alkylene oxide) is poly(ethylene oxide).

A suitable process for preparing the modified resole type phenolic resin according to the present invention comprises the following steps:

A) mixing the poly(alkylene oxide) a) and the phenol b) in a weight ratio of a): b)=1.5:1~1:1 at an elevated temperature to form a glutinous mixture;

B) mixing the glutinous mixture of step A) and the acid catalyst c) to obtain a viscous mixture having a relatively low viscosity compared to the glutinous mixture; and C) mixing the viscose mixture of step B) and the resole type phenolic resin d) to form a modified resole type phenolic resin, wherein the amount of the acid catalyst c) mixed is 2~10 wt %, and the amount of the poly (alkylene oxide) a) mixed is 2~10 wt % based on the resole type phenolic resin d).

The present inventors are surprised to find that the viscosity of the glutinous mixture in step a) can be significantly reduced by the addition of the acid catalyst. It is believed that the acid catalyst causes the poly(alkylene oxide) in the glutinous mixture become charge-carrying, and thus enhances its solubility in the polar phenol solvent, whereby facilitates the blending of the poly(alkylene oxide) with the resole type phenolic resin.

Contemplated as the functional, or operative, equivalent to the acid catalyst for purpose of the present invention is an electrolyte having catalytic ability.

A suitable process for preparing the modified novolac phenolic resin according to the present invention comprises the following steps:

A') mixing the poly(alkylene oxide) a) and the phenol b) in a weight ratio of a): b)=1.5:1~1:1 at an elevated temperature to form a glutinous mixture; and B') mixing the glutinous mixture of step A') and the novolac type phenolic resin d') to form a modified novolac type phenolic resin, wherein the amount of the poly(alkylene oxide) a) mixed is 2~10 wt % based on the novolac type phenolic resin d').

The process for preparing the modified novolac phenolic resin according to the present invention may further comprise:

C') mixing the curing agent with the modified novolac type phenolic resin from step B'), wherein the amount of the curing agent mixed is 2–15 wt % based on the weight of the novolac type phenolic resin d').

Preferably, the elevated temperature in the step A) and the step A') is about 100° C.

The pcly(alkylene oxide) d') has an excellent adhesive property so that a glutinous doughy mixture will be formed if it is mixed directly with the novolac type phenolic resin d') used in the present invention. The resulting glutinous doughy mixture is not able to be further processed in the fabrications of a composite material, coating composition, or an adhesive, and thus is not useful. In order to prepare a desired novolac type phenolic resin toughened by poly (alkylene oxide), the poly(alkylene oxide) d') has to be mixed with the phenol at an elevated temperature in the step A'). Please note that a commercially available novolac type phenolic resin which has a viscosity (an average molecular weight) significantly high than that of novolac type phenolic resin d') used in the present invention is not feasible in the present invention.

DETAILED DESCRIPTION OF THE INVENTION

The present invention is directed to a modified phenolic resin toughened by poly(alkylene oxide). Both the resole type phenolic resin and novolac type phenolic resin are able to be toughened by the poly(alkylene oxide) according to the present invention.

The phenolic resin is rigid in structure due to its bulky benzene rings; however, the phenolic resin also has a brittle nature because of the gaps existing between the benzene rings. In the present invention, the phenolic resin is successfully toughened by the poly(alkylene oxide) due to hydrogen bonds formed between the ether groups of poly (alkylene oxide) and the hydroxyl groups of the phenolic resin (a superior compatibility), and a reduced free volume thereof (a more compact structure) by filing the gaps with long flexible chains of the poly(alkylene oxide). The long flexible chains of the poly(alkylene oxide) therein are able to increase the amount of energy absorbed and extend the path of break down, when an external force is applied to the modified phenolic resin.

The ether groups of poly(alkylene oxide) can also enhance the coupling between the modified phenolic resin and a substrate, when the modified phenolic resin is used as a coating composition, adhesive or binder of a fiber reinforced resin composite. Moreover, the poly(alkylene oxide) not only can enhance the wet-out of fibers but also act as a lubricant, when the modified phenolic resin is used as a binder in the fabrication of a fiber reinforced resin composite.

A suitable process for preparing the resole type phenolic resin d) used in the present invention is by carrying out a condensation reaction of an excess amount of formaldehyde or the like and phenol in the presence of an alkaline catalyst. This process is well known in the art, such as the process described in U.S. Pat. No. 4,419,400, the disclosure of which is incorporated herein by reference.

The acid catalyst c) is well known in the art, including the organic acid catalyst disclosed in UK patent 1,363,277, details thereof are incorporated by reference. A preferred catalyst is selected from the group consisting of p-toluenesulfonic acid, phenol sulfonic acid, benzoic acid and phosphoric acid. The amount of said acid catalyst used ranges from 2 to 10 wt % based on the weight of the resole type phenolic resin, and preferably is about 5 wt %.

The acid catalyst c) may be used together with a promoter such as a guanidine, and preferably diphenylguanidine, wherein the amounts of the guanidine and the acid catalyst are about equal by weight.

In one of the preferred embodiments of the present invention, poly(alkylene oxide) and phenol were mixed and stirred at 100° C. to form a glutinous material, to which a mixture of p-toluenesulfonic acid and diphenylguanidine at 100° C. was then added while stirring, and a viscose mixture having a viscosity of 250 cps at 100° C. was obtained. To a resole type phenolic resin heated to 100° C. the viscose mixture was added and the resulting mixture was well stirred to obtain a modified resole type phenolic resin of the present invention. This modified resole type phenolic resin has a viscosity of 800~2000 cps after being cooled to 30° C. The viscosity was measured according to the method of ASTM D2393 with a Brookfield Viscometer. All the viscosity values were obtained by the same method in the present invention unless otherwise indicated.

A suitable process for preparing the novolac type phenolic resin d') used in the present invention is by carrying out a condensation reaction of formaldehyde or the like and phenol in a molar ratio of about 1:0.8 and in the presence of an acidic catalyst for a period of time, neutralizing the reaction mixture by adding an alkaline, separating the aqueous and organic layers thereof, and removing water and small molecules from the organic layer by evaporation. In another preferred embodiment of the present invention, the condensation reaction was carried out at 100° C. for 30 minutes, and the novolac type phenolic resin prepared has a number average molecular weight of about 492, and a weight average molecular weight of about 2032. Moreover, the novolac type phenolic resin prepared has a solid content of about 90 wt % and a free phenol content of about 0.15 wt %, wherein 19% of the linkage between two phenol rings via a methylene bond linkage is ortho-ortho, 57% thereof is other-para and 24% thereof is para-para.

In the another preferred embodiment of the present invention, poly(alkylene oxide) and phenol were mixed and stirred at 100° C. to form a glutinous material. To the novolac type phenolic resin prepared above at 100° C. the glutinous mixture was added and the resulting mixture was well stirred, and placed in an over at 80° C. for 30 minutes to obtain a modified novolac type phenolic resin of the present invention. This modified novolac type phenolic resin has a viscosity of 200~2000 cps after being cooled to 25° C.

The novolac type phenolic resin generally is a low molecular weight resin, because an excess amount of phenol is used to react with the aldehyde in the synthesis thereof, and the synthesized novolac type phenolic resin contains no reactive methanol groups (—$CH_2OH$) to propagate into a macromolecular compound. A curing agent such as hexamethylene tetramine has to be added to cross-link the novolac type phenolic resin, so that a hardened net-work structure is formed.

Most of the novolac type phenolic resins available in the market are in the form of powder and thus not suitable in a pultrusion process for preparing a fiber reinforced phenolic resin composite. A novolac type phenolic resin in a solution form is also commercially available; however it contains about 14 wt % organic solvent and about 86 wt % solid content. The organic solvent will vaporize and hazard to the environment during a pultrusion process for fabricating a fiber reinforced phenolic resin composite. A liquid novolac type phenolic resin is prepared by the inventors of the present invention, which can be used directly to impregnate fiber in a pultrusion process after the by-product water is removed therefrom in an oven under a reduced pressure.

A suitable phenol for use in the present invention includes (but not limited to) phenol, ortho-cresol, meta-cresol, para-cresol, dimethyl phenol, ethyl phenol, para-phenyl phenol, para-butyl phenol, para-pentyl phenol, bisphenol-A and meta-dihydroxyl benzene.

As it is well known in the art, mineral fillers such as talc, silica, and clay, etc. may be added into the liquid resin in order to improve the mechanical properties of the pultruded composites. The amount of said mineral fillers added is 10~20 wt % based on the weight of the modified phenolic resin.

The present modified phenolic resin can be used at least in the fabrication of a coating composition, adhesive composition and fiber reinforced resin composite. In each of the applications, the present modified phenolic resin used generates a significantly less amount of water side product during the cross-linking thereof such that the void content resulting from evaporation of water is decreased, and thus the toughness and mechanical strength of the final products are remarkably enhanced.

The invention will be further illustrated by a pultrusion process in the following examples in which parts and percentages are by weight unless otherwise indicated.

EXAMPLE 1

Preparation of Modified Resole Type Phenolic Resin Toughened by Poly(ethylene oxide) (PEO)

The modified resole type phenolic resin was prepared in accordance with the formula listed in the following Table 1.

TABLE 1

| Constituent | Weight (gram) | Manufacturer |
|---|---|---|
| 1) poly(ethylene oxide) (PEO), $\overline{M}w$ = 200,000 | 8 | Union Carbide Co., U.S. |
| 2) phenol | 8 | Union Chemicals, Inc., Taiwan |
| 3) p-toluenesulfonic acid | 5 | First Chemicals, Inc., Taiwan |
| 4) diphenylguanidine | 5 | Wako Chemicals, Inc., Japan |
| 5) resole type phenolic resin | 100 | Chang Chun Plastics Co., Ltd., Taiwan |

5) The resole type phenolic resin is a commercial phenol-formaldehyde resole type resin having a solid content of 70–75 wt % and sold under a code of PF-750 from Chang Chun Plastics Co., Ltd., Taiwan.

8 g poly(ethylene oxide) and 8 g phenol were mixed and stirred under nitrogen purge at 100° C. for one hour, and a miscible glutinous material was obtained. 5 g p-toluenesulfonic acid and 5 g diphenylguanidine were mixed and stirred in vacuo at 100° C. for 30 minutes, and then added to the glutinous material. The resulting mixture was thoroughly stirred for about 3 minutes, and a solution having a viscosity of about 250 cps at 100° C. was obtained. This solution was added to 100 g of resole type phenolic resin kept in an oven at 100° C., while gently stirring, and a miscible viscose solution was formed.

The aforesaid procedures were repeated except that the weight of the poly(ethylene oxide) was changed to prepare modified resole type phenolic resin products having different percentages of poly(ethylene oxide) based on the weight of the resole type phenolic resin (parts per hundred parts of resin by weight, phr).

EXAMPLE 2

Preparation of Modified Novolac Type Phenolic Resin Toughened by Poly(ethylene oxide) (PEO)

The modified novolac type phenolic resin was prepared in accordance with the formula listed in the following Table 2.

TABLE 2

| Constituent | Weight (gram) | Manufacturer |
|---|---|---|
| 1) poly(ethylene oxide) (PEO), $\overline{M}w$ = 200,000 | 8 | Union Carbide Co., U.S. |
| 2) phenol | 8 | Union Chemicals, Inc., Taiwan |
| 3) hexamethylene tetramine | 10 | Chang Chun Plastics Co., Ltd., Taiwan |
| 4) novolac type phenolic resin | 100 | Synthesized in this example |

1694 g (18 mol) phenol and 1217.5 g formaldehyde aqueous solution (37 wt %, 15 mol formaldehyde) were reacted in a 5.0 L three-neck flask containing a diluted $H_2SO_4$ solution (4 g $H_2SO_4$ in 20 mL $H_2O$) as a catalyst for 30 minutes. The reaction mixture was neutralized by NaOH$_{(aq)}$, and the organic layer of the neutralized reaction mixture was separated from the aqueous layer thereof. The remaining water and small molecules were then evaporated from the organic layer in vacuo to form a liquid novolac type phenolic resin which has a viscosity of about 300 cps at 25° C.

The novolac type phenolic resin prepared has a number average molecular weight of about 492, and a weight average molecular weight of about 2032 via GPC analysis. Moreover, the novolac type phenolic resin prepared was analyzed, and the results show that it has a solid content of about 90 wt % and a free phenol content of about 0.15 wt %, wherein 19% of the linkage between two phenol rings via a methylene bond linkage is ortho-ortho, 57% thereof is other-para and 24% thereof is para-para.

8 g poly(ethylene oxide) and 8 g phenol were mixed and stirred under nitrogen purge at 100° C. for one hour, and a miscible glutinous material was obtained. The miscible glutinous material was then added to 100 g of the novolac type type phenolic resin prepared above (100° C. while stirring, and the resulting mixture was then placed in an oven at 80° C. for 30 minutes to form a low viscosity solution like water. 10 g hexamethylene tetramine was then added to the low viscosity solution to form an impregnating resin ready for use in the following pultrusion process.

The aforesaid procedures were repeated except that the weight of the poly(ethylene oxide) was changed to prepare modified novolac type phenolic resin products having different percentages of poly(ethylene oxide) based on the weight of the novolac type phenolic resin (phr).

EXAMPLE 3

Pultrusion

The modified phenolic resin product prepared above was placed in an impregnating tank and maintained at a room temperature of 30° C. 20 rovings of 764-NT-218 glass fiber (PPG Co., US) were drawn into a bath of the impregnating resin which was maintained at 30° C. 764-NT-218 glass fiber has a specific gravity of 2.54, and a single strand of this fiber has a diameter of 13.1 μm and a tensile strength of $2.2 \times 10^5$ psi. The impregnated glass fiber rovings were passed through a squeeze orifice to remove excess resin and air and through a 82-cm long, 1.27-cm wide and 0.33-cm thick curing die. Two sets of individually controlled electrical plate heaters were installed on both top and bottom of the die, where the first and the second set of plate heaters have a length of 30 cm, and a temperature of 220° C. and 240° C. respectively. The pulling rate was fixed at 30 cm/min. The final pultruded composite product had a fiber content of 60 vol % when the modified resole type phenolic resin was used, and 70 vol % when the modified novolac type phenolic resin was used.

The final pultruded composites were further subjected to a posturing treatment at a temperature of 180° C. for a period of one hour.

The glass fiber reinforced modified phenolic resin composites pultruded according to the above-described process with modified phenolic resins containing different contents of phenolic resin with and without posturing were tested in accordance with the method of ASTM D790, ASTM D256, ASTM-2863 and UL-94 to obtain their flexural modulus, notched Izod impact strength, L.O.I. (limit oxygen index) and fire-retardancy (94V-0, 94V-1 or 94V-2), respectively. The results are shown in tables 3 and 4.

TABLE 3

| PEO content | Novolac type phenolic resin[1] | | | | Resole type phenolic resin[b] | | | |
|---|---|---|---|---|---|---|---|---|
| | Flexural modulus (GPa) | | Increment (%) | | Flexural modulus (GPa) | | Increment (%) | |
| (phr) | U | P | U | P | U | P | U | P |
| 0 | 31.00 | 33.10 | — | — | 29.50 | 30.57 | — | — |
| 2 | 32.02 | 34.50 | 3.29 | 4.23 | 30.17 | 32.14 | 2.27 | 5.14 |
| 4 | 33.00 | 36.77 | 6.45 | 11.1 | 60.57 | 32.81 | 3.63 | 7.33 |
| 6 | 33.51 | 37.46 | 8.10 | 13.2 | 31.11 | 33.61 | 5.46 | 9.94 |
| 8 | 32.16 | 34.56 | 3.61 | 4.41 | 30.92 | 33.00 | 4.81 | 7.95 |
| | Impact strength (KJ/m) | | Increment (%) | | Impact strength (KJ/m) | | Increment (%) | |
| | U | P | U | P | U | P | U | P |
| 0 | 1.382 | 1.606 | — | — | 1.338 | 1.554 | — | — |
| 2 | 1.578 | 1.761 | 14.2 | 9.71 | 1.500 | 1.694 | 12.1 | 8.96 |
| 4 | 1.618 | 1.986 | 17.1 | 23.7 | 1.551 | 1.886 | 15.9 | 21.3 |
| 6 | 1.828 | 2.179 | 32.3 | 35.7 | 1.737 | 2.041 | 29.8 | 31.3 |
| 8 | 1.698 | 2.025 | 22.9 | 26.1 | 1.627 | 1.912 | 21.6 | 23.0 |

[a]: fiber content: 70 wt %
[b]: fiber content: 60 wt %
U: without postcuring
P: with postcuring (180° C., 1 hr)

TABLE 4

| | UL-94 | L.O.I. |
|---|---|---|
| Fiber reinforced modified resole type phenolic resin composite | 94V-0 | >55 |
| Fiber reinforced modified novolac type phenolic resin composite | 94V-0 | >55 |

As it can be seen from the data in Table 3 that the flexural modulus and impact strength of the postured and un-postulated glass fiber/modified phenolic resin composite are enhanced when the percentage of poly(ethylene oxide) based on the weight of the phenolic resin (phr) increases, and the glass fiber/modified phenolic resin composite prepared by the modified phenolic resin containing 6 wt % of poly(ethylene oxide) (phr) has the highest flexural modulus and impact strength. The results show that blending a small amount of poly(ethylene oxide) in the phenolic resin has a good toughening effect. Moreover, the results also show that the posturing treatment can significantly enhance the mechanical properties of the glass fiber/modified phenolic resin composite.

The UL-94 and L.O.I. test results listed in Table 4 indicate that the glass fiber/modified phenolic resin composite is an excellent fireproof material having a good fire-retardancy and a low smoke amount.

What is claimed is:
1. A modified resole phenolic resin toughened by poly (alkylene oxide) comprising:
   a) a poly(alkylene oxide) having a weight average molecular weight of 100,000~8,000,000;
   b) a phenol;
   c) an acid catalyst; and
   d) a resole phenolic resin having a solid content of 60~75 wt % and a free aldehyde content of 5~10 wt %; in which the amounts of components a), b) and c) are 2–10%, 2–15% and 2–10%, respective, based on the weight of component d).
2. The modified resole phenolic resin according to claim 1, wherein the poly(alkylene oxide) is poly(ethylene oxide), poly(propylene oxide) or a mixture of poly(ethylene oxide) and poly(propylene oxide).

3. The modified resole phenolic resin according to claim 2, wherein the poly(alkylene oxide) is poly(ethylene oxide).

4. The modified resole phenolic resin according to claim 1, wherein the amounts of said poly(alkylene oxide) and the phenol are about equal by weight.

5. The modified resole phenolic resin according to claim 1, wherein the amount of the poly(alkylene oxide) is 4–8% based on the weight of the resole type phenolic resin d).

6. The modified resole phenolic resin according to claim 1, wherein the amount of the acid catalyst is 5 wt % based on the weight of the resole type phenolic resin d).

7. The modified resole phenolic resin according to claim 1 further comprising a guanidine as a promoter, wherein the amounts of the guanidine and the acid catalyst are about equal by weight.

8. The modified resole phenolic resin according to claim 1, wherein the guanidine is diphenylguanidine.

9. The modified resole phenolic resin according to claim 1, wherein said acid catalyst is selected from the group consisting of p-toluenesulfonic acid, phenol sulfonic acid, benzoic acid and phosphoric acid.

10. The modified resole phenolic resin according to claim 1, wherein said phenol is selected from the group consisting of phenol, ortho-cresol, meta-cresol, para-cresol, dimethyl phenol, ethyl phenol, para-phenyl phenol, para-butyl phenol, para-pentyl phenol, bisphenol-A and meta-dihydroxyl benzene.

11. A modified novolac phenolic resin toughened by poly(alkylene oxide) comprising:
   a) a poly(alkylene oxide) having a weight average molecular weight of 100,000–8,000,000;
   b) a phenol; and
   d') a novolac phenolic resin having a viscosity of 200–2000 cps at 25° C.;
in which the amounts of components a) and b) are 2–10% and 2–15%, respectively, based on the weight of component d').

12. The modified novolac phenolic resin according to claim 11, wherein the novolac phenolic resin has a viscosity of about 300 cps at 25° C.

13. The modified novolac phenolic resin according to claim 11 further comprising 2–15 wt % of a curing agent based on the weight of component d').

14. The modified novolac phenolic resin according to claim 13, wherein the amount of the curing agent is 10% based on the weight of component d').

15. The modified novolac phenolic resin according to claim 13, wherein the curing agent is selected form the group consisting of hexamethylene tetramine, S-triamine, and trimethylol phosphine oxide.

16. The modified novolac phenolic resin according to claim 15, wherein the curing agent is hexamethylene tetramine.

17. The modified novolac phenolic resin according to claim 11, wherein the poly(alkylene oxide) is poly(ethylene oxide), poly(propylene oxide) or a mixture of poly(ethylene oxide) and poly(propylene oxide).

18. The modified novolac phenolic resin according to claim 17, wherein the poly(alkylene oxide) is poly(ethylene oxide).

19. The modified novolac phenolic resin according to claim 11, wherein the amounts of said poly(alkylene oxide) and the phenol are about equal by weight.

20. The modified novolac phenolic resin according to claim 11, wherein the amount of the poly(alkylene oxide) is 4–8% based on the weight of the novolac phenolic resin d').

21. The modified novolac phenolic resin according to claim 11, wherein said phenol is selected from the group consisting of phenol, ortho-cresol, meta-cresol, para-cresol, dimethyl phenol, ethyl phenol, para-phenyl phenol, para-butyl phenol, para-pentyl phenol, bisphenol-A and meta-dihydroxyl benzene.

22. A process for preparing the modified resole phenolic resin according to claim 1 comprising the following steps:
   A) mixing the poly(alkylene oxide) a) and the phenol b) in a weight ratio of a): b)=1.5:1~1:1 at an elevated temperature to form a glutinous mixture;
   B) mixing the glutinous mixture of step A) and the acid catalyst c) to obtain a viscous mixture having a relatively low viscosity compared to the glutinous mixture; and
   C) mixing the viscose mixture of step B) and the resole phenolic resin d) to form a modified resole phenolic resin, wherein the amount of the acid catalyst c) mixed is 2~10 wt %, and the amount of the poly(alkylene oxide) a) mixed is 2~10 wt % based on the resole phenolic resin d).

23. The process according to claim 22, wherein the elevated temperature is about 100° C.

24. The process according to claim 22, wherein the poly(alkylene oxide) is poly(ethylene oxide), poly(propylene oxide) or a mixture of poly(ethylene oxide) and poly(propylene oxide).

25. The process according to claim 24, wherein the poly(alkylene oxide) is poly(ethylene oxide).

26. The process according to claim 22, wherein the poly(alkylene oxide) and the phenol are mixed in a weight ratio of about 1:1.

27. The process according to claim 22, wherein the amount of the poly(alkylene oxide) mixed is 4–8 wt % based on the weight of the resole phenolic resin.

28. The process according to claim 22, wherein the amount of the acid catalyst mixed is 5 wt % based on the weight of the resole phenolic resin.

29. The process according to claim 22, wherein the acid catalyst is mixed with a guanidine as a promoter prior to mixing with the glutinous mixture of step A), wherein the amounts of the guanidine and the acid catalyst are about equal by weight.

30. The process according to claim 29, wherein the guanidine is diphenylguanidine.

31. The process according to claim 22, wherein said acid catalyst is selected from the group consisting of p-toluenesulfonic acid, phenol sulfonic acid, benzoic acid and phosphoric acid.

32. The process according to claim 22, wherein said phenol is selected from the group consisting of phenol, ortho-cresol, meta-cresol, para-cresol, dimethyl phenol, ethyl phenol, para-phenyl phenol, para-butyl phenol, para-pentyl phenol, bisphenol-A and meta-dihydroxyl benzene.

33. A process for preparing the modified novolac phenolic resin according to claim 11 comprising the following steps:
   A') mixing the poly(alkylene oxide) a) and the phenol b) in a weight ratio of a): b)=1.5:1~1:1 at an elevated temperature to form a glutinous mixture; and
   B') mixing the glutinous mixture of step A') and the novolac phenolic resin d') to form a modified novolac phenolic resin, wherein the amount of the poly(alkylene oxide) a) mixed is 2~10 wt % based on the novolac phenolic resin d').

34. The process according to claim 33, wherein the elevated temperature is about 100° C.

35. The process according to claim 33 further comprising:

C') mixing a curing agent with the modified novolac phenolic resin from step B'), wherein the amount of the curing agent mixed is 2–15 wt % based on the weight of the novolac phenolic resin d').

36. The process according to claim 35, wherein the amount of the curing agent mixed is 10% based on the weight of component d').

37. The process according to claim 35, wherein the curing agent is selected form the group consisting of hexamethylene tetramine, S-triamine, and trimethylol phosphine oxide.

38. The process according to claim 37, wherein the curing agent is hexamethylene tetramine.

39. The process according to claim 33, wherein the poly(alkylene oxide) is poly(ethylene oxide), poly(propylene oxide) or a mixture of poly(ethylene oxide) and poly(propylene oxide).

40. The process according to claim 39, wherein the poly(alkylene oxide) is poly(ethylene oxide).

41. The process according to claim 33, wherein the poly(alkylene oxide) and the phenol are mixed in a weight ratio of about 1:1.

42. The process according to claim 33, wherein the amount of the poly(alkylene oxide) mixed is 4–8 wt % based on the weight of the novolac phenolic resin.

43. The process according to claim 33, wherein said phenol is selected from the group consisting of phenol, ortho-cresol, meta-cresol, para-cresol, dimethyl phenol, ethyl phenol, para-phenyl phenol, para-butyl phenol, para-pentyl phenol, bisphenol-A and meta-dihydroxyl benzene.

44. The process according to claim 33, wherein said novolac phenolic resin d') has a viscosity of about 300 cps at 25° C.

\* \* \* \* \*

UNITED STATES PATENT AND TRADEMARK OFFICE
CERTIFICATE OF CORRECTION

PATENT NO. :   5,965,671
DATED      :   October 12, 1999
INVENTOR(S) :  Chen-Chi Martin Ma, et al.

It is certified that error appears in the above-identified patent and that said Letters Patent is hereby corrected as shown below:

Col. 2, line 31 "rescle" should be --resole--.

Col. 3, line 49 "pcly" should be --poly--.

Col. 7, line 56 "posturing" should be --postcuring--.

Col. 7, line 62 "posturing" should be --postcuring--.

Col. 8, line 3 "resin$^1$" should be --resin$^a$--.

Col. 8, line 38 "postured" should be --postcured--.

Col. 8, line 47 "posturing" should be --postcuring--.

Signed and Sealed this

Fourteenth Day of March, 2000

Attest:

Attesting Officer

Q. TODD DICKINSON

Commissioner of Patents and Trademarks